United States Patent Office 3,437,526
Patented Apr. 8, 1969

3,437,526
SINTERED NICKEL BORIDE ELECTRODE AND FUEL CELL THEREWITH
Ingemar Lindholm and Bo Mueller, Vasteras, Sweden, assignors to Allmänna Svenska Elektriska Aktiebolaget, Vasteras, Sweden, a corporation of Sweden
No Drawing. Filed Aug. 23, 1963, Ser. No. 304,101
Claims priority application Sweden, Aug. 27, 1962, 9,237/62
Int. Cl. H01m 27/04
U.S. Cl. 136—86          13 Claims Electrical energy may be generated among other things by means of reaction between a continually supplied combustible substance such as, for example, hydrogen and a continually supplied oxidizing substance, such as for example oxygen, air or a halogen in a so-called fuel cell, which in its simplest form may consist of a suitable fluid electrolyte and two porous electrodes immersed in this electrolyte, one of which is arranged between the electrolyte and the combustible substance and the other between the electrolyte and the oxidizing substance.

The electrode reactions in the fuel cell occur in the contact areas between electrolyte, combustible and the oxidizing substances respectively and electrode. These contact places are situated at the areas in the electrodes where electrolyte and combustible and oxidizing substances respectively are adjacent to each other. The areas of the electrodes which are active during the reaction are therefore situated in the pore surfaces.

A porous electrode in a fuel cell need not form a separating wall between a gas chamber containing a gaseous substance, such as a fuel, and an electrolyte chamber containing a fluid electrolyte. The combustible substance may instead be dispersed or dissolved in the electrolyte, as is the case with cells for fluid fuel and then the electrolyte with its fuel is located on both sides of the electrode as well as in its pores. Certain oxidants, such as hydrogen peroxide, may also be dissolved in the electrolyte used and then the conditions for the electrode on the oxidant side are analogous to those described for the electrode on the fuel side in fuel cells with fluid fuel.

In fuel cells it is known to use electrodes, which in the main are built up of nickel, and in which the areas nearest the pore walls contain nickel in activated form. In the parts of the electrodes situated outside the mentioned areas nickel is present in inactive form and its task is to act as a carrier material for the active areas situated nearest the pore walls. Such an electrode may according to a known method be manufactured with the use of nickel powder and a powder consisting of an aluminium-nickel alloy ("Raney-alloy"). A mixture of the powders is compressed to an electrode, which is then sintered. After the sintering the aluminium is dissolved out of the aluminium-nickel alloy, the "Raney-alloy") in the sintered product with an alkali, micro-pores thus being formed. The area around the pores becomes active due to the large pore surfaces and the disturbed crystal lattice which the remaining material has after the dissolution of the aluminium. The pure nickel powder acts after the sintering, as previously indicated, as a carrying body for the electrode, while the material of the alloy remaining after the dissolution with alkali forms the active area which surrounds the pores. As a replacement for the pure nickel powder for the known electrode there have been suggested carbon-, iron-, and cobalt powder and as a replacement for the said alloy other alloys, in which nickel may be replaced by cobalt or iron, and aluminium by silicon, magnesium or zinc. The electrodes can among other things be used as fuel electrodes for hydrogen.

It has now been found possible to manufacture an electrode material which shows substantial advantages compared with those previously known. The electrode material is directly usable after the sintering and need not be subjected to any subsequent treatment, such as a dissolution process with alkali. Another important advantage is that the electrode material has very good mechanical properties. Further the electrode material is resistant to air and contrary to the described known electrode may without difficulty be kept at room atmosphere. Another particularly important advantage of the new electrode material is that with its use high current densities can be attained, even with operating temperatures below 100° C.

The object of the invention is a porous electrode material, preferably for use in fuel cells, comprising a material which is arranged at least at the pore surface of the electrode material and active upon contact between an oxidisable substance, such as hydrogen, and an electrolyte in the pores. The electrode material according to the invention is characterised in that the active material comprises a nickel boride or a product remaining after at least a partial dissolution of boron out of a nickel boride. If a porous electrode material of the kind in question with nickel boride arranged at the pore surfaces is placed in an alkaline liquid there occurs at least a partial dissolution of boron out of the nickel boride. After such a dissolution of boron the electrode is still at least as active as before. Such a dissolution of boron is automatically obtained if the electrode material with nickel boride at the pore surfaces is used as a fuel electrode in a fuel cell with an alkaline liquid, such as a potassium hydroxide solution, as electrolyte or in another arrangement with an alkaline electrolyte, where electrode reactions with hydrogen as participant part are used for generating electrical energy, for example, in accumulators. Of course, if desired, the dissolution of boron may be performed before the electrode material is arranged in the fuel cell or in the completed arrangement. According to the invention the electrode material in addition to the active material may comprise an inactive carrier material for the active material, preferably consisting of one of the substances iron, nickel, cobalt, carbon, tungsten, and molybdenum. The sintered porous electrode consists suitably of grains of the active material and the inactive material sintered together with the grains of the different materials uniformly distributed over the whole electrode material. The active material may suitably constitute 2–40 percent of the weight of the electrode material.

The electrode material may be manufactured by forming into an electrode a powder consisting of particles of a nickel boride or a mixture containing particles of a nickel boride and particles of the inactive carrier material through pressing or the like and sintering the formed electrode in vacuum or an inert atmosphere. By an inert atmosphere is meant an atmosphere which does not damage the boride.

The nickel boride may be manufactured according to known methods such as through precipitation of it from a solution of a nickel salt, such as nickel chloride or acetate, with sodium borohydride solution or through electrolytic precipitation from a solution of nickel oxide in alkali or earth alkali borates. In order to improve the activity of the manufactured nickel boride the precipitation may occur in the presence of a salt of one or several of the metals chromium, molybdenum, tungsten, vanadium, cerium, thorium, cobalt and platinum metals such as platinum and palladium, so that lesser amounts, less than 5 percent by weight, calculated on nickel, of these metals are incorporated in the nickel boride.

The particle size of the particle materials may be varied within wide limits depending on the fuel and electrode type in question. The size of the pores in a manufactured electrode is determined to a great extent by the size of the particles used. In most cases it is desirable that all the pores are the same size, which is attained through the use of well demarcated powder fractions. In many cases it is suitable to use powder fractions with an average particle size of 1–50μ for the nickel boride and powder fractions with an average particle size of 1–25μ for the inactive carrier material. With the use of nickel as the inactive carrier material it has been found especially advantageous to use powder fractions with an average particle size less than 15μ for the nickel boride and powder fractions with an average particle size less than 10μ for the nickel. In order to increase the porosity of the electrode there may be added to the mixture of particles up to about 25 percent by weight of an expanding agent, such as ammonium carbonate or ammonium bicarbonate, having the capacity to dissociate into gaseous products during the sintering process.

The invention will be more fully explained in connection with the description of a number of non-limitative embodiments, in which the percentages given for the solutions are percent by weight.

EXAMPLE 1

A nickel boride is manufactured by means of reaction between 100 cm.$^3$ 5%-water solution of $NiCl_2 \cdot 6H_2O$ and 23 cm.$^3$ 10%-water solution of $NaBH_4$. The precipitated nickel boride contains about 8% boron. 4 parts by weight of this nickel boride with an average particle size of about 5μ are mixed with 96 parts by weight carbonyl nickel powder with an average particle size of about 5μ. The mixture is compressed into electrodes with a diameter of 36 mm. and a thickness of 2 mm. with a pressure of 2700 kiloponds/cm.$^2$ and is sintered 30 min. in hydrogen at 600° C. The electrode is usable as fuel electrode, such as for hydrogen.

EXAMPLE 2

10 parts by weight of the same nickel boride as in Example 1 with an average particle size of about 5μ are mixed with 90 parts by weight carbonyl nickel powder with an average grain size of about 5μ. The mixture is compressed into electrodes with a diameter of 36 mm. and a thickness of 2 mm. with a pressure of 2700 kiloponds/cm.$^2$ and sintered 30 min. in hydrogen at 500° C. The electrode is usable as a fuel electrode, such as for hydrogen.

EXAMPLE 3

4 parts by weight of the same nickel boride as in Example 1 with an average particle size of about 25μ are mixed with 96 parts by weight carbonyl nickel powder with an average particle size of about 5μ. The mixture is compressed into electrodes with a diameter of 36 mm. and a thickness of 2 mm. with a pressure of 2700 kiloponds/cm.$^2$ and sintered 30 min. in nitrogen at 500° C. The electrode is usable as a fuel electrode, such as for hydrogen.

EXAMPLE 4

10 parts by weight of a nickel boride containing lesser amounts of chromium, manufactured by means of reaction between 100 cm.$^3$ 5%-water solution of $NiCl_2 \cdot 6H_2O$, 2 cm.$^3$ 5%-water solution of $Cr_2(SO_4)_3$ and 23 cm.$^3$ 10%-water solution of $NaBH_4$, with an average particle size of about 25μ are mixed with 90 parts by weight carbonyl nickel powder with an average particle size of about 5μ. The mixture is compressed into electrodes with a diameter of 36 mm. and a thickness of 2 mm. with a pressure of 2700 kiloponds/cm.$^2$ and is sintered 30 min. in nitrogen at 600° C. Chromium acts here as promoter for the active nickel boride. Instead of the chromium salt may as previously mentioned, e.g. salts containing vanadium, molybdenum, cerium, tungsten, thorium, cobalt or platinum metals, be used. The electrode is usable as a fuel electrode, such as for hydrogen and methanol.

EXAMPLE 5

10 parts by weight of the same nickel boride as in Example 1 with an average particle size of about 5μ are mixed with 83 parts by weight carbonyl iron powder with an average particle size of about 20μ and 7 parts by weight ammonium carbonate with an average particle size of about 70–80μ. The mixture is compressed into electrodes with a diameter of 36 mm. and a thickness of 2 mm. with a pressure of 3000 kiloponds/cm.$^2$ and sintered 30 min. in a hydrogen atmosphere at 800° C. The electrode is usable as a fuel electrode, for example for hydrogen.

EXAMPLE 6

10 parts by weight electrolytically manufactured nickel boride with a boron content exceeding 9% and with an average particle size of about 25μ are mixed with 90 parts by weight molybdenum powder with an average particle size of about 30μ. The mixture is compressed into electrodes with a diameter of 36 mm. and a thickness of 2 mm. with a pressure of 1500 kiloponds/cm.$^2$ and sintered 60 min. in vacuum at 1000° C. The electrode is usable as a fuel electrode, for example for hydrogen and carbon monoxide.

For all the electrode materials produced according to the examples it is found that after they have been used for some time as fuel electrodes in a fuel cell with potassium hydroxide, for example a 30% potassium hydroxide water solution, as the electrolyte, and thereby at least a partial dissolution of boron out of the nickel boride has taken place, they show an activity which is at least as great as the original one. Not even after use for a long time, when at least nearly all boron is dissolved out, do the electrodes show a decreased activity.

The described electrodes could be used in fuel cells with different electrolytes, such as potassium or sodium hydroxide solutions. The electrode material may not only be formed into plates but also among other things as pellets, grains or the like. Such electrode material in pellet or grain form is used among other things in fuel cells with fluid fuel, such as spirit dissolved in the electrolyte, in which case for example it may be arranged in a container manufactured of a net or perforated sheet metal. The electrode material may also be used in fuel cells of the type where the electrolyte consists of an ion exchange membrane of organic or inorganic type.

The described electrodes may with advantage be used not only in fuel cells but also in other types of arrangements where electrode reactions with hydrogen as participant part are used for generating electrical energy, as in accumulators.

We claim:

1. A fuel cell having electrodes in contact with an electrolyte, at least one of said electrodes being formed of a body material having pores therein and permeable to gas, said body material consisting essentially of a material produced by admixing grains of nickel boride with grains of a carrier material consisting essentially of at least one substance selected from the group consisting of iron, nickel, cobalt carbon, tungsten, and molybdenum; forming the resulting mixture into a body and sintering said body, the amount of nickel boride being from 2 percent to 40 percent by weight of said body material.

2. A fuel cell as claimed in claim 1, in which the sintering is carried out at a temperature of at least 500° C.

3. A fuel cell as claimed in claim 1, in which there is added to said nickel boride chromium in an amount of less than 5 percent by weight of the nickel of said nickel boride.

4. Electrode material comprising a body material having pores therein and permeable to gas, said body material consisting essentially of a material produced by admixing grains of nickel boride with grains of a carrier material consisting essentially of at least one substance selected from the group consisting of iron, nickel, cobalt, carbon, tungsten, and molybdenum; forming the resulting mixture into a body and sintering said body, the amount of nickel boride being from 2 percent to 40 percent by weight of said body material.

5. Electrode material as claimed in claim 4 in which the carrier material consists essentially of nickel.

6. Electrode material as claimed in claim 4 in which the carrier material consists essentially of iron.

7. Electrode material as claimed in claim 4 in which the carrier material consists essentially of cobalt.

8. Electrode material as claimed in claim 4 in which the carrier material consists essentially of carbon.

9. Electrode material as claimed in claim 4, in which there is added to said nickel boride chromium in an amount of less than 5 percent by weight of the nickel of said nickel boride.

10. Electrode material as claimed in claim 4, in which the sintering is carried out at a temperature of at least about 500° C.

11. Electrode material as claimed in claim 4 in which the boron is at least partially dissolved from the sintered body.

12. Electrode material comprising a body material having pores therein and permeable to gas, said body material consisting essentially of a material produced by admixing grains of nickel boride with grains of a carrier material consisting essentially of at least one substance selected from the group consisting of iron, nickel, cobalt, carbon, tungsten, and molybdenum; forming the resulting mixture into a body and sintering said body, the amount of nickel boride being at least 2 percent by weight of said body material, the sintering being carried out at a temperature of at least about 500° C.

13. Electrode material as claimed in claim 12, in which there is added to said nickel boride chromium in an amount of less than 5 percent by weight of the nickel of said nickel boride.

References Cited

UNITED STATES PATENTS

| | | | |
|---|---|---|---|
| 3,317,349 | 5/1967 | Elliott et al. | 136—86 |
| 3,183,124 | 3/1965 | Jasinski | 136—120 XR |
| 3,166,833 | 2/1965 | Globus | 29—182.5 |
| 3,183,123 | 5/1965 | Haworth | 136—120 XR |

FOREIGN PATENTS

| | | |
|---|---|---|
| 127,242 | 4/1959 | Great Britain. |
| 463,444 | 3/1937 | France. |

ALLEN B. CURTIS, *Primary Examiner.*

O. F. CRUTCHFIELD, *Assistant Examiner.*

U.S. Cl. X.R.

136—120